Aug. 29, 1950  M. B. ROBINSON  2,520,433
DIRECTED MISSILE
Filed Nov. 10, 1941  4 Sheets-Sheet 2
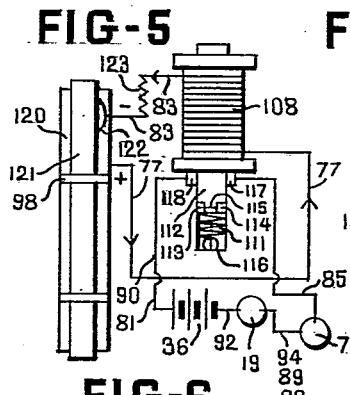
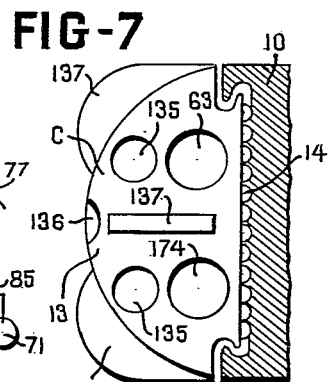
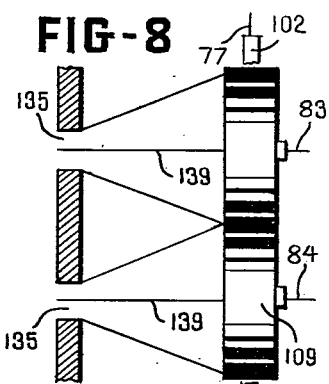
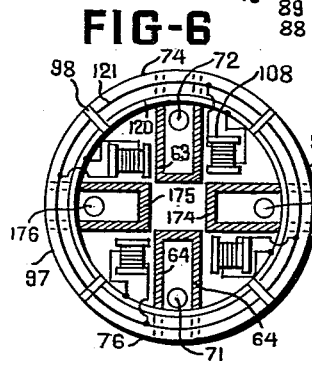
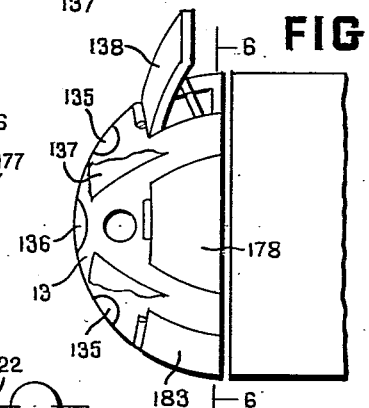
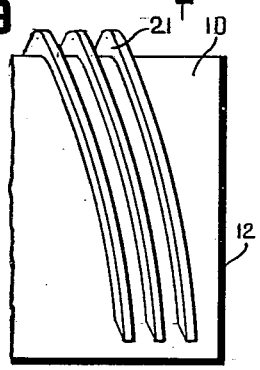
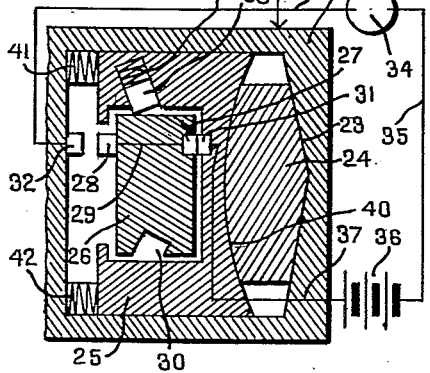
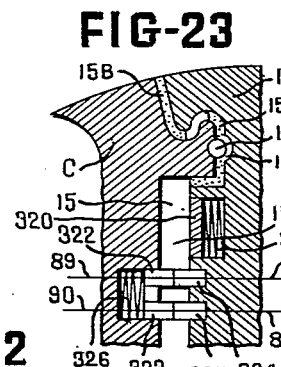
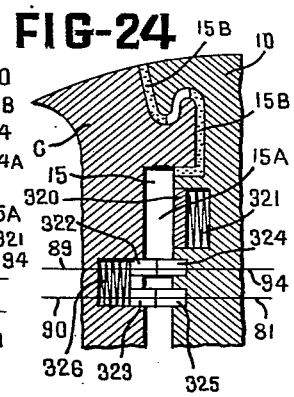
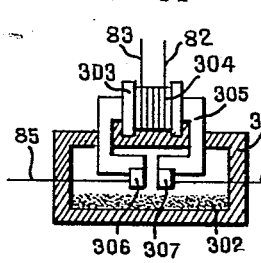
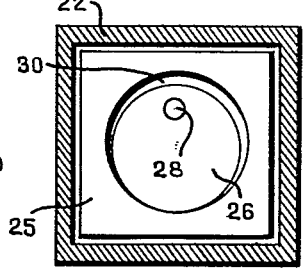
INVENTOR.
BY Marion B. Robinson

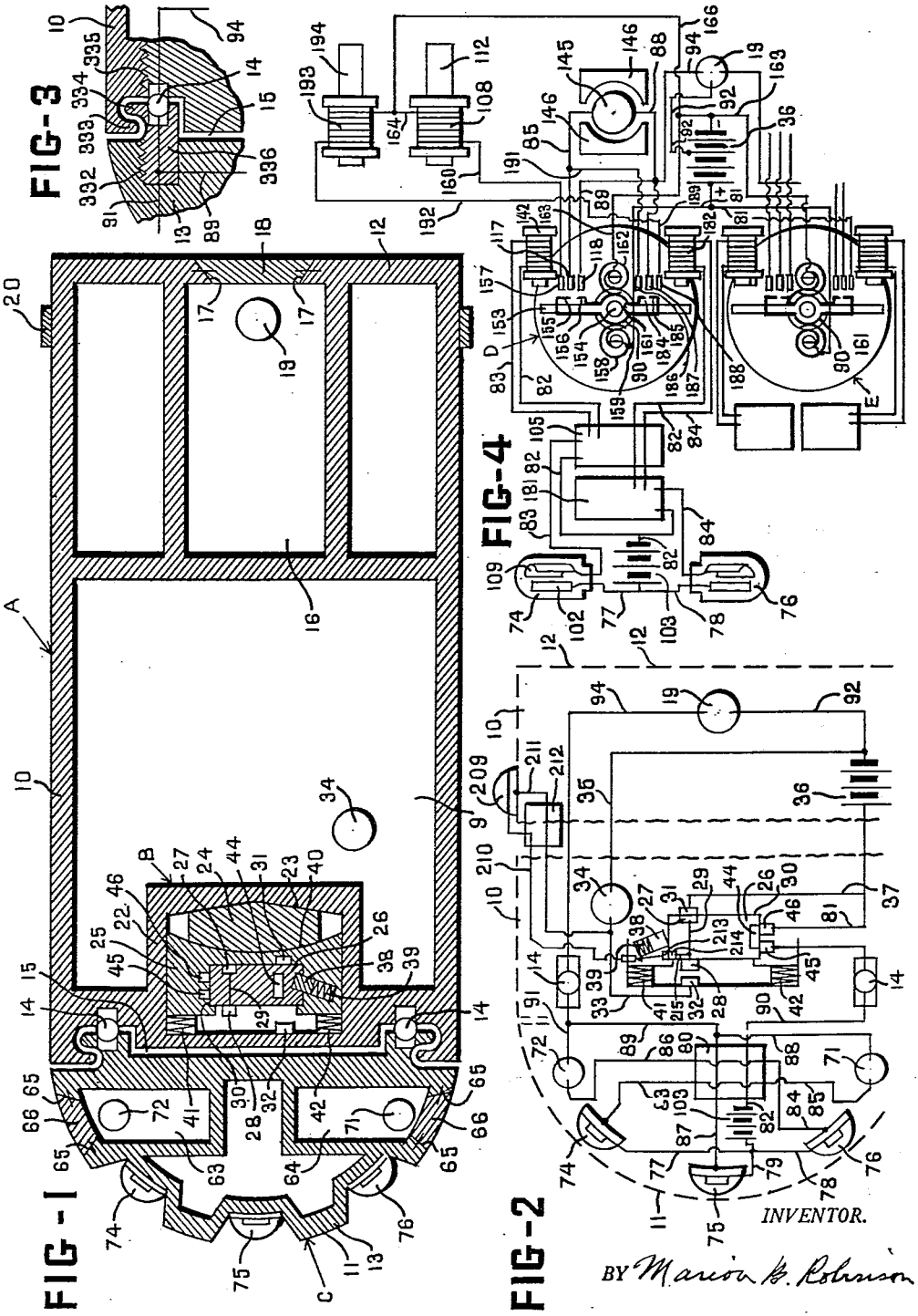

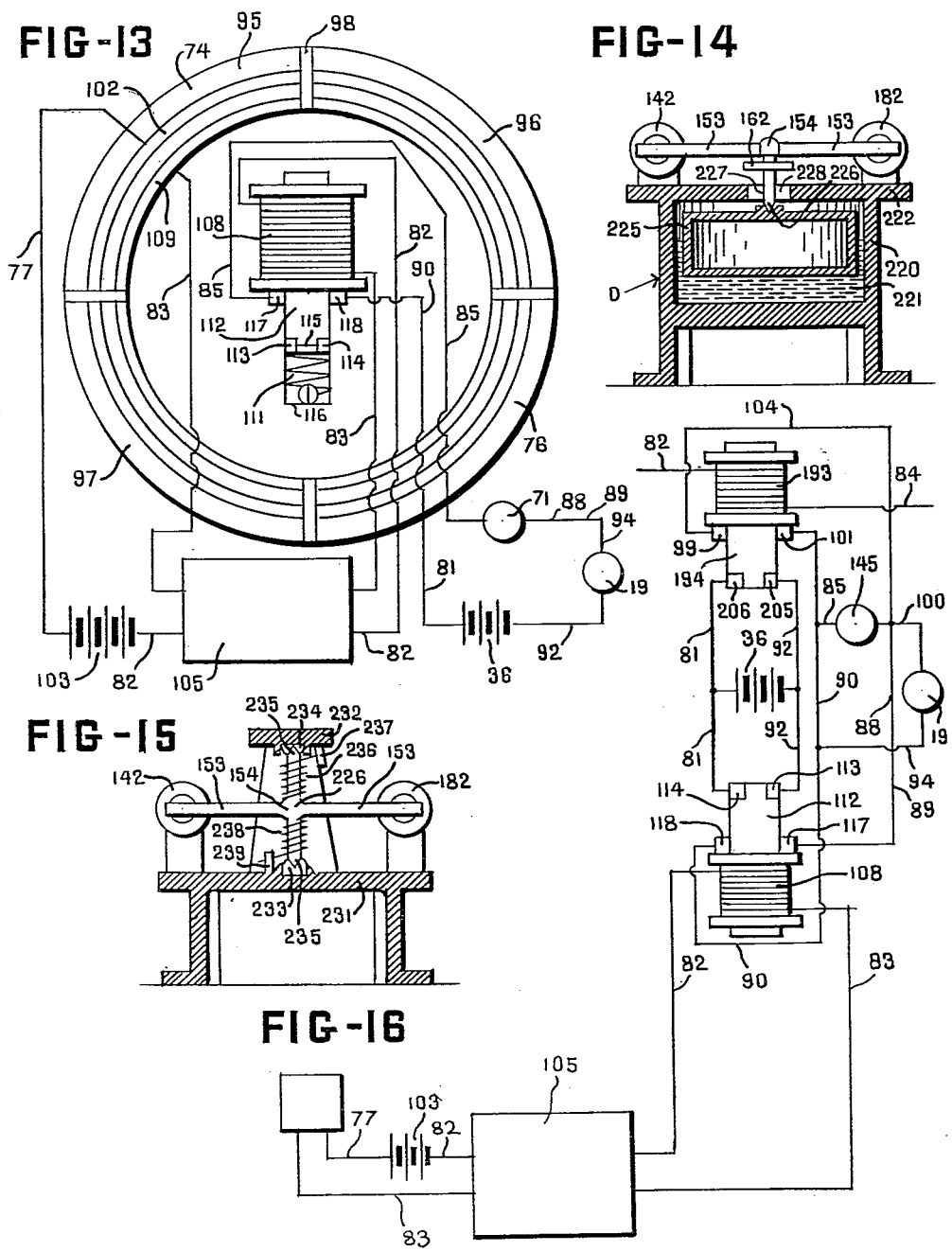

Aug. 29, 1950
M. B. ROBINSON
2,520,433
DIRECTED MISSILE
Filed Nov. 10, 1941
4 Sheets-Sheet 4
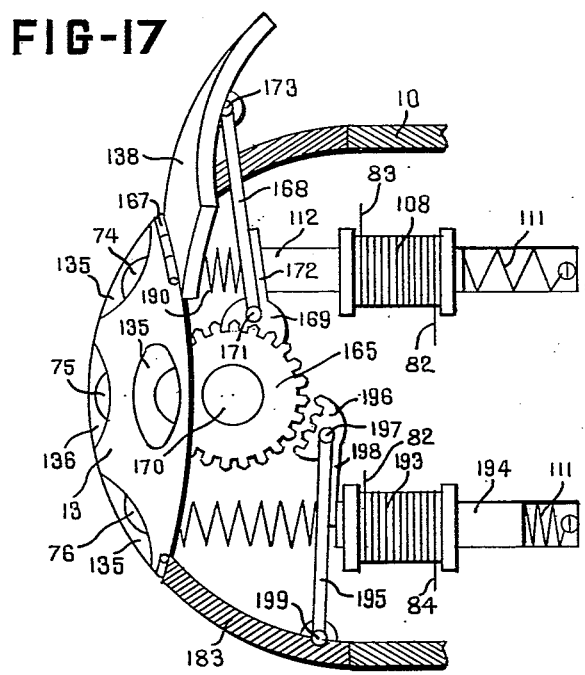
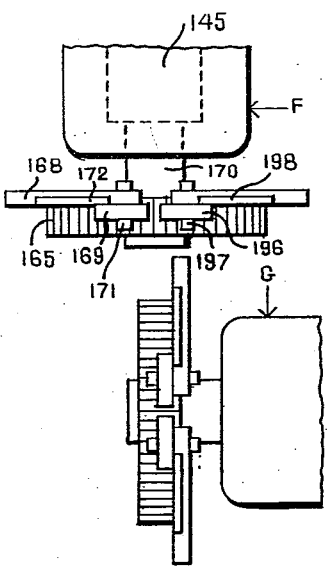
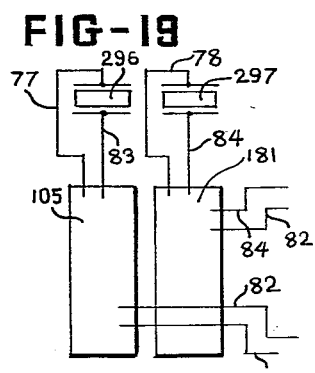
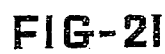
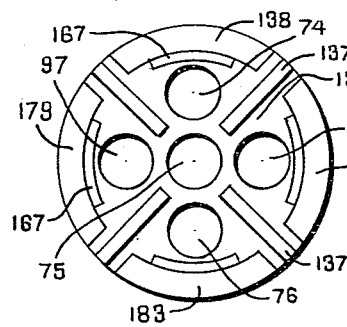
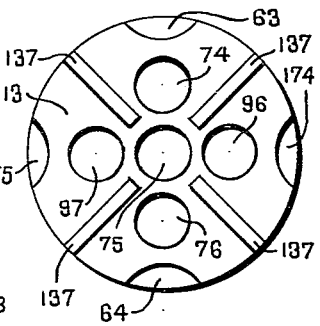
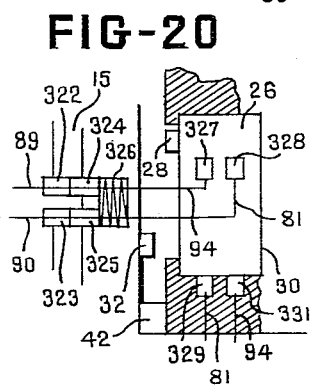
INVENTOR.
BY Marion B. Robinson Patented Aug. 29, 1950

2,520,433

UNITED STATES PATENT OFFICE 2,520,433

DIRECTED MISSILE

Marion B. Robinson, Great Neck, N. Y.

Application November 10, 1941, Serial No. 418,497

18 Claims. (Cl. 102—50)

This invention relates broadly to one or a plurality of radiation receiving means, including one or a plurality of pick-up means responsive to radiation for operating a plurality of suitable directing means and is adapted for use with a rocket propelled body, whether the body is a rocket, rocket propelled torpedo or mines, rocket propelled missiles, or rocket propelled missiles which are projected and drop from an elevation or which are dropped from aircraft toward an object or objective, and the pick-up means and directing means associated wtih the receiving means may be used on or in any part of the body whether the body is imparted with rotation or a non-rotating body.

The invention broadly comprehends in a rocket propelled body, one or a plurality of radiation responsive receiving means including one or a plurality of pick-up means responsive to radiation or any other known means to which a pick-up means is responsive can be employed as a substitute, for directing the same by the radiation being received from any direction depending on the placement in or on the body of the pick-up means to the radiation approaching the body for activating means for steering the same and for rendering the rocket propelling means active.

The invention also broadly comprehends a body, radiation receiving means for directing the same by the radiation being transmitted to the radiation receiving means or the radiation may be reflected by the target or objective to the radiation receiving means carried by the vehicle for activating means for steering the same and for rendering the rocket propelling means active.

The invention also broadly comprehends a rocket propelled body, radiation receiving means for directing the same by the radiation cut off to the receiving means by the target or objective being in a position between the radiation transmitting means and the radiation receiving means, to activate the radiation receiving means carried by the vehicle for activating means for steering the same and for rendering the rocket propelling means active.

The invention also broadly comprehends a pick-up means controlled by radiation for exploding the main charge of the projectile when the projectile reaches the vicinity at which the aircraft are traveling. This means could be used instead of the time fuse now employed.

The invention also contemplates a body directing means, including vanes or rocket charges respectively responsive to the radiation receiving means for turning the body in any desired direction by movement of one of the vanes or one of the rocket charges, or at various angles by the movement of two vanes or two of the rocket charges, which radiation receiving means utilizes pick-up means responsive to radiation carried by the body, and said radiation being remote from said body for respectively activating the vanes or rocket charges.

The invention broadly comprehends any type of powder or rocket propellant or explosive force which exerts a propelling or pressure force in reaction to the action of the explosive force, acting according to Newton's third law of motion, where every action must be accompanied by a reaction equal in strength but opposite in direction for propelling and directing the body with any type of pick-up means responsive to radiation for activating any type of electrical means for controlling the steering means and for rendering the powder or, rocket propelling means or explosive means active to move and steer the body to a target or objective.

This invention is a continuation-in-part of my copending application Serial Number 340,629, filed June 15, 1940, now abandoned.

With the above enumerated and other objects in view, the invention is set forth in greater detail in the following specifications, particularly pointed out in the appended claims and illustrated in the accompanying drawings, in which:

Fig. 1 is a diagrammatic section plan view of a projectile, showing one of the possible applications of the invention, showing a rotating body portion and a non-rotating nose portion.

Fig. 2 is a diagrammatic detailed view of the wires leading from the pick-up means to the electrically responsive devices associated with the rocket chambers and electrically responsive device associated with the main explosive.

Fig. 3 is a diagrammatic sectional view of the means for holding the rotating body portion to the non-rotating nose portion, showing the placement of a non-friction means.

Fig. 4 is a magnetic compass needle relay means incorporated in the wires or include an amplifying circuit, to close a circuit on a low amperage and so formed to withstand the force of set-back occurring at the gun.

Fig. 5 is a diagrammatic view of one of the possible radiation pick-up means showing a plurality of barrier-layer type of cell, arranged in a circular manner and showing one cell connected to a solenoid for completing a circuit.

Fig. 6 is a diagrammatic view of the complete arrangements of the cells arranged in a circular manner, showing a solenoid coupled to each cell and the general position of the directing rocket chambers.

Fig. 7 is a diagrammatic perspective view of the non-rotating nose portion showing bearings, and including holes and fins for shielding the pick-up means and for retarding rotation of the nose portion. Part of the body portion shown in section.

Fig. 8 is a diagrammatic sectional view of two of the holes, indicating how the radiation passes through the holes to the cathode of the cells.

Fig. 9 is a diagrammatic perspective view of the projectile with a portion in the center cut away, showing the use of elevator directing means substituted for the rocket directing rocket chambers. A self-rotating means is shown located on the rear of the projectile.

Fig. 10 is a diagrammatic section plan view of the fuse adapted to be used in a non-rotating body.

Fig. 11 is a diagrammatic section view of a means of closing a circuit on a low amperage and also equipped to withstand the force of set-back occurring when the projectile is fired from the gun.

Fig. 12 is a diagrammatic perspective view of the front portion of the fuse of Fig. 1 and Fig. 10.

Fig. 13 is a diagrammatic view of one of the possible radiation pick-up means, showing a plurality of photo-electric tubes arranged in a circular manner and showing one of the photo-electric tubes connected to a solenoid for completing a circuit.

Fig. 14 is a diagrammatic sectional view of the magnetic compass needle relay, showing its base floating in liquid.

Fig. 15 is a diagrammatic sectional view of a modified form of the magnetic compass needle relay showing the needles base pivot on jeweled bearings. This type of relay is for use in a projectile which does not encounter set-back.

Fig. 16 is a diagrammatic view of a circuit for actuating the propelling charge and the operating directing means.

Fig. 17 is a diagrammatic sectional view of the nose of the projectile with part in perspective, showing the motor and gear means for opening the elevators.

Fig. 18 is a diagrammatic perspective view of the motors for opening the elevators.

Fig. 19 is a diagrammatic view of two microphones for connection to two-amplifying circuits which in desirable instances may be used instead of the photo-electric tubes in Fig. 4.

Fig. 20 is a diagrammatic sectional view of another means for maintaining an electrical connection between the rotating and non-rotating portions of the projectile.

Fig. 21 is a diagrammatic perspective view of the front of the nose portion, showing the position of the elevators, photo-electric cells and fins.

Fig. 22 is a diagrammatic perspective view of the front of the nose portion showing the position of the openings of the rocket chamber, the photo-electric cells and the fins.

Fig. 23 is a diagrammatic section view of the non-friction means showing the use of liquid and ball bearings between the non-rotating nose portion and the rotating rear portion, showing the electrical connecting means between the two portions.

Fig. 24 is a diagrammatic sectional view of the non-friction means showing the use of liquid between the non-rotating nose portion and the rotating rear portion, showing the electrical connecting means between the two portions.

Referring to the drawings by character of reference, A designates generally one of the possible uses for the invention and is shown in the form of a projectile, but may be of any desired form and the term projectile is employed broadly to cover other types of bodies for controlling the movements of a body to a target or objective, whether said target or objective be an object on land, in the air, or on the surface of or under the water. It will therefore be understood that when the term "projectile" is used it may cover any one of a number of various types such as a rocket, or rocket propelled balloons, or rocket propelled torpedos or mines, or a rocket propelled missile, or rocket propelled missiles which are projected and drop from an elevation, or rocket propelled missiles which are dropped from aircraft towards a target or objective.

The projectile A is shown in the form of a rocket projectile or missile having a hollow cylindrical body 10, having semispherical front and flat rear ends 11 and 12. Where the invention is to be used as a rotating body it will be equipped with two portions, one of said portions rotatably mounted on the other of said portions. For illustration but not limitation, the body portion 10 is shown rotatably mounted on a nose portion 13 with an anti-friction means which will include bearings 14 or liquid placed in the opening between the two portions at 15, or may include both bearings and liquid. A means is provided to retard rotation of one portion. The body 10 houses any desired type of rocket or explosive means whose rocket chamber 16 and outlet 17 are diagrammatically illustrated in Fig. 1, and which rocket means is used for driving the projectile A forwardly in the direction of its longitudinal axis. Said outlet is normally sealed by a closure element or disk 18 which is adapted to be displaced when the rocket or explosive means is rendered active. The rocket chamber 16 contains an electrically responsive device 19 used for rendering the rocket propelling means active. The electrically responsive device 19 may be placed in the casing of the chamber 16 or in any part of the rocket chamber and is controlled by one of the pick-up means, to be described hereinafter.

The body 10 of the projectile is equipped with the conventional rifling band 20 used for the purpose of rotating the projectile as it travels in the bore of the gun, but it is to be understood that the broad concept of the invention covers a rotating rocket projectile and may include a rifling means as shown at 21 in Fig. 9, if the projectile is projected by its rocket charge from another body or the earth.

In addition to containing an explosive charge of any desired type and means for detonating the same, either by timing device, by impact, or by a radiation responsive means or otherwise, and as shown, the body 10 houses a fuse, generally designated by the reference character B, and includes a hollow cube shaped container 22, Fig. 1, Fig. 10, Fig. 12, and having a hollow cube interior with a flat front end and all flat side walls with its rear wall being somewhat cone-shaped as shown at 23. This fuse casing is so fastened to the projectile body 10 as to rotate with the body. The inside mechanism may be of any desired material and consists of a solid cylindrical member 24 whose rear surface is arranged to fit against the cone-shaped rear wall 23 of the casing 22, its front surface being somewhat arc-shaped as shown at 40, and its circular side wall being of a diameter somewhat less than that of the diameter of inner fuse casing 22, to permit it to move up or down or sidewise in said space. In front of said member 24, is a cubular plunger 25, its front wall being flat with its rear wall arc-shaped shown at 40, to the same curve as the front wall of member 24, all of its side walls being essentially flat in shape to slideably fit the flat walls of casing 22 and is movable only forwardly and rearwardly in its casing in the interior of fuse casing 22. It is evident by this arrangement of member 24 and plunger 25 that on a side impact of the projectile member 24 will move sidewise and impart a forward movement to plunger 25 for exploding the destructive charge as will be evident by a later description of the fuse.

In the center of plunger 25 is a hollow cylindrical opening 30 in which is loosely fit a solid cylindrical arming member 26, flat on its front and rear ends. This cylindrical arming member 26, is somewhat smaller in diameter than its hollow cylindrical compartment 30, so that as its compartment 30 rotating with plunger 25 and with the projectile body 10 the cylindrical arming member 26 will rotate at a reduced rate when freed to do so. This cylindrical arming member 26 is restrained from moving forward or rearward, as shown by the shape of its casing. The cylindrical arming member 26 contains two electrical contact terminals 27 and 28, Fig. 2, with a connecting wire 29 attached to each terminal and continuing through the cylindrical arming member 26.

Forward and rearward of said contact terminals 27 and 28 are companion contact terminals 31 and 32 which contact terminals are positioned so that when contact terminals 31 and 32 are rotated with plunger 25 and fuse casing 22 the projectile body and the tubular arming member 26 rotating at a different rate, contact terminals 27 and 28, they are rotated to a position opposite terminal 31 and 32 respectively, Fig. 1, shows the position before arming of the fuse, and Fig. 2 and Fig. 10, shows the position after rotation. Contact terminal 32 is mounted on the front inner wall of the fuse casing 22 while contact terminal 31 is mounted in plunger 25. The fuse mechanism is included in an electrical circuit with a wire 33 connected to the contact terminal 32 and continuing to and connected to one side of the electrically responsive firing device 34, so arranged with the projectile as to detonate the main explosive charge within chamber 9 in the projectile. A wire 35 connects to the opposite side of firing device 34 and continues and connects to the negative terminal of the battery 36. A wire 37 attached to the positive terminal of the battery continues from and connects to contact terminal 31 located in the plunger 25. The tubular arming member 26 is held in unarmed position as shown in Fig. 1, by a spring pressed centrifugal interruptor 38, so that the terminals 27 and 28 must rotate at a different rate than terminal 31 and 32 before a connection between the four terminals can occur. Interruptor 38 is positioned in a forwardly-slanting aligned hole in tubular arming member 26 and plunger 25. Spring 39 is mounted in said hole in back of said interruptor 38 for the purpose of normally pressing the interruptor towards the axis of the tubular arming member 26.

When the projectile leaves the gun, tubular arming member 26 when freed by interruptor 38 as described hereinafter, will rotate at a different rate than plunger 25. Due to the difference in diameter as shown in Fig. 12 the plunger 25 will continually rotate with the projectile body, whereupon contact terminal 27 gradually rotates with member 26 to a position touching contact terminal 31 while contact terminal 28 gradually rotates to a position directly opposite contact terminal 32, Fig. 2, Fig. 1, and Fig. 10. Contact terminals 27 and 31 are adapted to engage in any suitable manner and thereafter hold tubular arming member 26 against further individual rotation relative to casing in plunger 25, so that it rotates with said casing in plunger 25 and with the projectile body, and the fuse is then armed. After this occurrence any forward movement of plunger 25 would result in the completion of a circuit by terminals 28 and 32 touching, resulting in the activating of the electrically responsive device 34. Helical spring 41 and 42 are positioned between the forward surface of plunger 25 and the inside front wall of the fuse casing 22. These springs serve to hold the contact terminals separated until the projectile contacts an object whereupon contact terminals 28 and 32 are forced to touch and complete the circuit.

Interruptor 38 is held in place in tubular arming member 26 until centrifugal action, resulting from the twirling movement of the projectile after it leaves the gun, pulls it back against its spring pressure to thus free tubular arming member 26 and permit a free movement between the tubular arming member in its casing 30 in plunger 26. This interruptor is set at an angle as shown, such that the centrifugal force will not pull the interruptor against its spring pressure until the force of acceleration of the projectile has lessened. At this point centrifugal force becomes greater than the acceleration upwards, plus force of spring 39, thus permitting the interruptor to clear the tubular arming member and free it from its casing 30 in plunger 25. On the arming of said fuse by the movement of plunger 25 at a different rate than movement of the tubular arming member 26, a contact terminal 44 on member 26 is adapted to connect two contact terminals 45 and 46 on member 25, thereby connecting all photo-electric cells with the battery 36, Fig. 2, as described hereinafter. Until the arming of the fuse all photo-electric cells have been disconnected. These cells will be later described.

Where the invention is used in a non-rotating body 10, the same fuse may be used as above described but the arming members of the fuse may be inactive or removed as shown, Fig. 10 and Fig. 12, also shown in Fig. 3, in my co-pending application Serial No. 340,629, filed June 15, 1940, of which this application is a continuation-in-part.

This fuse is always armed and ready to explode the main explosive charge when the projectile contacts an object. As shown, the retarded portion is generally designated by the reference character C, and includes a hollow nose portion 13. The nose portion houses a plurality of rockets, or explosive directing means whose chambers and outlets two of which are diagrammatically illustrated at 63 and 64, Fig. 1, and are circumferentially spaced around the nose portion. The outlets 65 of all rocket chambers open through the side walls of the nose.

Said rocket or explosive means are adapted when active to impart a pressure force transversely of the axis of the projectile and in the direction opposite the outlet 65. The outlets 65 are normally sealed by closure plugs 66 which are displaced when the rocket or explosive means are rendered active. The rocket chamber 63 and 64 contains electrically responsive firing devices 71 and 72 used for rendering the rocket or explosive means active. The electrically responsive devices 71 and 72 may be placed in the casing of the chambers 63 and 64 or in any part of the rocket chambers and controlled by the pick-up means.

The photo-electric cells illustrated in Fig. 1, Fig. 2, Fig. 4, Fig. 5 and Fig. 13, are used to diagrammatically illustrate one type of pick-up means responsive to radiation for controlling the movements of the body, but the invention is to be considered in its broadest sense and to include a pick-up means responsive to radiation and includes any frequency on the spectrum from the lowest cycles to the highest megacycles and it is evident that the receiving means may receive the radiation reflected from the target, or the receiving means may receive the radiation without the presence of the target or by which the radiation is being stopped by the presence of the target or objective appearing between the radiation and the radiation receiving means, but contemplates in its broad sense that the radiation may eminate or be transmitted from any direction outside the body and one or more of the radiation means located on the body may be activated by the transmitted or reflected radiation from any position outside the body, and thereby direct the projectile to the target or objective. The invention as shown and described only considers the description and function of a radiation receiving means located on a projectile. The influences created at positions outside the projectile for accomplishing the function of the radiation receiving means on the projectile is not to be limited to any one means but covers all means adapted to activate the radiation means located on the projectile. The arrangement of the wiring from the pick-up means may vary depending on which of the radiation receiving means are to be used.

Fig. 2 shows the wiring for connecting the various parts of Fig. 1, as from the photo-electric cells to the various electrically responsive devices and the battery. The amplifying circuits are indicated in block diagram 80 ,and will be described later. The circuits leading from the anodes in photo-electric cells 74, 75, and 76 are attached to wires 77, 78 and 79, which wires all lead to the positive terminal of a battery 103, a wire 82 attached to the negative terminal of the battery 103 and is shown extending through the amplifying circuits 80 and connected to a wire 90 which wire continues to and connects with the contact means through the lower bearings 14 to the contact terminal 45, which as shown in Fig. 2, is in contact with a contact terminal connection 44, which terminal 44 forms a circuit between contact terminals 45 and 46. A wire 81 connects to contact terminal 46 and continues and is attached to the positive terminal of the battery 36. The cathode of photo-electric cell 74 is attached to a wire 83 which extends through the amplifying circuit 80 and connects to wire 85 to the electrically responsive device 71. The cathode of photo-electric cell 76 is attached to a wire 84 which extends through the amplifying circuit 80 and connects with wire 86 to the electrically responsive device 72. The cathode of photo-electric cell 75 is attached to a wire 87 which continues through the amplifying circuit 80 to and connects with a wire 88 which wire 88 is attached to the opposite side of the electrically responsive device 71. These two wires 87 and 88 continue to and attach to a common wire 89, which wire 89 is attached to a wire 91, wire 91 is attached to the opposite side of the electrically responsive device 72. The wires 87, 88 and 89, all attach to a common conductor wire 94, which wire 94 extends through the contact connection on the top bearings 14 and continues to the electrically responsive device 19, located in the rocket chamber 16. A wire 92 attached to the opposite side of the electrically responsive device 19 continues to and is attached to the negative terminal of the battery 36.

As will be noted by checking the wiring arrangement, when the photo-electric cell 74 is activated an electrical current flows through wires 77 and 83, the wire 77 leads from the anode to and connects to the positive terminal of the battery 103 and connects to the wires 82 and 90 which wires 82 and 90 continues through the lower bearing connection 14 and through the contact terminals 44, 45 and 46, and on wire 81 to the positive terminal of the battery 36. The wire 92 leads from the negative terminal of the battery 36 to the electrically responsive firing device 19, for firing a rocket or explosive means within chamber 16. A wire 94 connects to and leads from the opposite side of the electrically responsive device 19 through the upper bearing 14 and connects to the wire 89. Wire 89 leads and connects to wire 88 to the electrically responsive device 71 for firing a rocket or explosive means within the chamber 64. A wire 85 leads from the opposite side of the electrically responsive device 71 and connects to wire 83 to the cathode of photo-electric cell 74. It thus follows that when the photo-electric cell 74 is rendered active the electrically responsive device 71 becomes active simultaneously with the electrically responsive device 19. As will be noted also, by checking the wiring, that when the photo-electric cell 76 becomes activated the electrically responsive device 72 becomes active simultaneously with the electrically responsive device 19. As will be noted also, by checking the wiring, that when the photo-electric cell 75 becomes active it operates only the electrically responsive device 19, and acts independently of the photo-electric cells 74 or 76 or the electrically responsive devices 71 and 72. The wire 79 leading from the anode of photo-electric cell 75 to and connects with the common wires 82 and 90 and through the electrical connection of the lower bearings 14 and through the contact terminals 44, 45 and 46, to the wire 81, which wire 81 leads to the positive terminal of the battery 36. A wire 92 leading from the negative terminal of the battery 36, to and connects to one side of the electrically responsive device 19. A wire 94 attached to the opposite side of the electrically responsive device 19 and continues through the electrical connection of the top bearing 14 to and connects with the wire 89, which wire 89 is attached to the wire 87 to the cathode of the photo-electric cell 75. There is a duplicate of the photo-electric cells 74 and 76, one designated by numeral 96 placed on the nose towards the reader, shown in Fig. 21 and Fig. 22, and one placed on the nose as at 97 opposite the reader, with a duplicate of the wiring, and the rocket chambers 63 and 64, one facing the reader as at 174, shown in Fig. 6 and Fig. 22 and one away from the reader as at 175. These several parts function as previously described of photo-electric cell 74 and 76. By this wiring arrangement the photo-electric cell 75 acts independent of the photo-electric cell 74 and 76. It will be apparent that the photo-electric cell 75 controlling the propelling rocket means may be activated independently, either simultaneously or before activation of cells 74, 76, controlling the directing means. If after radiation has caused the directing and propelling means to operate and the radiation ceases, then and only then can cell 75 be activated after the cells 74 and 76. The amplifying circuit and relay means is shown in blocked diagram, Fig. 4 and Fig. 13.

The invention contemplates in its broad sense that the pick-up means 75 used to activate the propelling rocket charge may receive the radiation first, as radiation may be sent to the pick-up means 75 from positions outside the projectile or the reflected radiation from an object may be received by the pick-up means 75 first, and activate the propelling rocket charge in chamber 16, first, and while being propelled forwardly, any deviation or out of alignment of the projectile with relation to the target or objective, one of the pick-up means 74 or 76 used to activate one of the directing means 63 or 64 will become activated to turn the projectile back on alignment towards the target or objective. As the projectile contains at least two additional pick-up means 96 and 97, Fig. 6 and Fig. 22, adapted to activate at least two additional directing means 174 and 175, with an electrically responsive device 176 and 177 and each being controlled by a solenoid means Fig. 5, Fig. 13 and Fig. 16, or the magnetic compass needle relay means Fig. 4, or the electrically contacting means of Fig. 11, to be described hereinafter. The projectile will continually be re-directed by these means until the target or objective is reached.

It is to be understood that the pick-up means 74, 75, 76, 96 and 97, and that the rocket means 63, 64, 174 and 175 or elevators 138, 183, 178 and 179, Fig. 21 and Fig. 22 (to be described), may be moved to any other position on the nose or body and be controlled or otherwise where the body is non-rotating. Where the body is rotating the non-rotating portion may be moved to another position on the body and all pick-up means and all rocket means or all elevators may be re-arranged on any part of the non-rotating portion.

There are two types of cells shown, Fig. 13 and Fig. 5. Fig. 13, shows the photo-electric tube type and Fig. 5, the barrier layer type.

Fig. 13 shows the lens or window 95 for transmitting the light to the photo-electric tube 74. The photo-electric tubes 74, 76, 96 and 97, divided into four sections, with insulation between each section, shown at 98. Each section controls a solenoid coil as shown in Fig. 5, Fig. 6 and Fig. 13, or the magnetic compass needle relay of Fig. 4, or the electrically contacting means of Fig. 11.

By following the wiring of Fig. 2, as shown in Fig. 13, the wire 77 leads from the anode 102 of the photo-electric tube 74 and is attached to the positive terminal of a battery 103, a wire 82 extends from the negative terminal of the battery 103, to one part of the amplifier circuit shown in block diagram 105 or as shown as one part of 80 in Fig. 2. The wire 83 from the cathode 109 of photo-electric tube 74 leads directly to another part of the amplifier circuit in block diagram 105. The current is amplified by the circuit in block diagram 105. On the opposite side of block diagram 105 the wire 82 is shown as the same wire entering the block diagram to follow the wiring of Fig. 2, this wire carries the amplified current to one side of a solenoid coil 108. On the opposite side of block diagram 105, the wire 83 is shown as the same wire entering the block diagram to follow the wiring of Fig. 2, this wire 83 leads to the opposite side of the solenoid coil 108. In the center of the solenoid coil is a movable soft iron core 112 attached to a spring 111 to keep the soft iron core in a neutral position. The soft iron core is adapted to move upward when the solenoid coil 108 is energized. Positioned on the soft iron core 112 are two contact terminals 113 and 114 with a wire 115 connecting the two terminals through the soft iron core. Located on the container 116 in which the soft iron core 112 is adapted to travel are two contact terminals 117 and 118, adapted to come in contact with contact terminal 113 and 114 when the soft iron core is moved, thereby connecting wire 85 and 90, these wires may be checked in Fig. 2. Wire 85 is attached to the contact terminal 117 and leads to one side of the electrically responsive device 71. Wires 88, 89 and 94 attach to the opposite side of the electrically responsive device 71 and continues and attaches to one side of the electrically responsive device 19. A wire 92 is attached to the opposite side of the electrically responsive device 19 and continues and attaches to the negative terminal of the battery 36. A wire 81 attaches to the positive side of the battery 36 and continues and attaches to wire 90, which wire 90 attaches to the contact terminal 118.

When the flow of light falls on the cathode 109 it emits electrons, which travel to the anode 102. This stream of electrons constitutes an electric current flowing to the battery 103 and is amplified by tubes in block diagram 105 (the tubes found in conventional amplifying circuits 105), it is to be understood that these tubes may operate the several electrical connecting means without the amplifying circuits and also that the photo-electric cells may be of a nature sensitive to various frequencies on the spectrum, such as infra-red or ultra-violet, etc.

Fig. 5 shows the barrier layer type of cell, which may be adapted to close a circuit to the battery without the use of an amplifier current, and consists of a circular plate of metal 120 (nickel-iron alloy) covered with a thin, transparent film 121, of light sensitive material, such as (selenium), but is not limited to selenium as other materials may be used that are sensitive to various frequencies on the spectrum, such as infra-red, or ultra-violet, etc. A small central ring 122 (or, in some form, a metal rim) is in contact with the film 121 and forms the negative pole of the cell. The underlying metal plate 120 is the positive pole. Light falling on the film drives the electrons out of the film 121 to the plate 120 and forms a barrier layer of electrons. Through this layer electrons cannot pass as readily as through the selenium, therefore, the electric current flows through the wires as indicated by the arrow heads in the diagram. This cell transforms light energy into electrical energy. The numbers correspond to those of Fig. 13, and also follow the wires of Fig. 2. The wire 77 is attached to the positive metal plate 120 and continues to and is attached to one side of the solenoid coil 108. The wire 83 attached to the opposite side of the solenoid coil 108 and continues and connects to central ring 122 of the film 121 or the negative part of the cell. A resister 123 is interposed on the wire 83. The solenoid coil 108 contains a movable soft iron core 112 containing two contact terminals 113 and 114 with a connecting wire 115 through the soft iron core. A spring 111 keeps the soft iron core 112 in a neutral position in the solenoid coil 108. Two contact terminals 117 and 118 are located on a container 116 in which the soft iron core 112 is adapted to move to connect the four terminals. The contact terminal 118 is attached to wires 90, 81, which wires continue to and are attached to the positive terminal of the battery 36. The wire 92 is attached to the negative terminal of the battery 36 and continues to the firing device 19. Wires 94, 89, 88, are attached to the opposite side of the firing device 19 and continues to and are attached to one side of the firing device 71. A wire 85 is attached to the opposite side of the firing device 71 and continues and connects to contact terminal 117.

An amplifying circuit may be placed on the wires 77 and 83. When the cell is activated by light, the solenoid becomes energized and forces the soft iron core upward and a circuit is formed to the battery by the four contact terminals to activate the firing devices and activate the rocket or explosive charges connected with the chamber 16, and chamber 64. Fig. 6 shows the arrangement of Fig. 5, from a front end view, showing the placement of a plurality of solenoids 108 in the metal plate 120 and film 121 and the placement of the rocket directing chambers 63, 64, 174 and 175. Each chamber includes an electrically firing device 71, 72, 176 or 177. The metal plate 120 and film 121 are in sections as shown, with insulation 98 between so that each section is a separate cell.

In both Fig. 5 and Fig. 13, the contact terminals may be reversed so that contact terminals 117 and 118 may be placed in a lower position on the casing 116, and the contact terminals 113 and 114 may be placed higher on the soft iron core 112 so that as the cell or photo-electric cell receives the light, the contact terminals 113 and 114 will be separated from the contact terminals 117 and 118, but when an object or objective cuts off this light, the soft iron core 112 will be pulled by its spring 111 and make contact between the four contact terminals and function as previously described.

A means may or may not be used to provide and insure that the radiation reaches only the pick-up means facing the approaching radiation, by adding a plurality of holes or openings 135 in the casing of the nose portion 13, and a hole or opening 136 at the very tip, Fig. 7. These holes 135 and 136 permit the pick-up means to scan selected areas, so that the radiation approaching the projectile in the scanned areas will activate the pick-up means scanning or facing this area and the remaining holes will shade the remaining pick-up means. Each pick-up means are placed in back of one of the holes.

The holes 135 and the hole 136 in desirable instances will be adjusted in size to allow radiation to penetrate any one of the holes 135 and the hole 136 at the same time, thus operating one of the pick-up means used for directing the projectile and the pick-up means 136 used for propelling the projectile simultaneously where the wiring is arranged as shown in my co-pending application Serial No. 340,629, filed June 15, 1940.

Fig. 8 diagrammatically illustrates the radiation passing through the holes 135 and widens as it reaches the cathode 109, the straight line 139 indicates where the light is concentrated the strongest. The anode 102 has been partly removed in this view.

The invention also contemplates a shielding means, such as fins 137, to function in cooperation with the holes 135 or the pick-up means without the holes 135 and shown in Fig. 7, Fig. 9, Fig. 21 and Fig. 22. The fins protrude radially from the nose so that all pick-up means are shaded from radiation approaching the projectile except the pick-up means facing in the direction of the approaching radiation. The fins 137 also perform the function of retarding the rotation of the nose portion 13 as they are acted on by the pressure of air while the projectile is moving.

In Fig. 1, Fig. 2 and Fig. 7 is shown a ball bearing means 14 placed between the non-rotating nose 11 and the rotating body 10 to act as a non-friction means between the two portions to allow the body 10 to rotate and the nose portion to be non-rotating when acted on by air pressures against the fins 137.

In Fig. 23 is shown the combination of a liquid bearing and a ball bearing. In the space 15 between the non-rotating nose C and the rotating body portion 10 is placed the combination of a liquid bearing 15A and a ball bearing 14. The liquid bearing 15A is of a suitable quantity to maintain the non-rotating nose portion C and the body portion separated. At two positions 15B are placed washers of sponge rubber or felt or any other suitable material to keep the liquid 15A from leaving the container 15. These washers are fastened to the body 10 in any suitable manner. When the projectile is shot from the gun the force of acceleration forces the non-rotating nose portion slightly to the rear so that the ball bearing fits in the seat 14A and compresses the liquid 15A and washers 15B. The pressure on the liquid bearing 15A forces a movable section 320 placed circularly around the opening 15 to the rear against its spring 321. When all parts are adjusted to the speed the projectile is traveling, the liquid is forced forward by the movable section 320 and spring 321 to buoy the nose portion and free it from the pressure allowing the washers and ball bearings to loosen somewhat, so that the nose is free of the rotating body 10 and due to the fins 137 shown in Fig. 7, the nose portion will be stopped from rotating with the body 10. The electrical connecting-means is shown the same as described in Fig. 20, to be described hereinafter.

In Fig. 24 is shown a liquid bearing. In the space 15 between the non-rotating nose C and the rotating body portion 10 is placed the combination of a liquid bearing 15A. The liquid bearing 15A is of suitable quantity to maintain the non-rotating nose portion C and the body portion separated. At two positions 15B are placed washers of sponge rubber or felt or any other suitable material to keep the liquid 15A from leaving the container 15. These washers are fastened to the body 10 in any suitable manner. When the projectile is shot from the gun the force of acceleration forces the non-rotating nose portion slightly to the rear and compresses the liquid 15A and washers 15B. The pressure on the liquid bearing 15A forces a movable section 320 placed circularly around the opening 15, to the rear against its spring 321. When all parts are adjusted to the speed the projectile is traveling the liquid is forced forward by the movable section 320 and spring 321 to buoy the nose portion and free it from the pressure allowing the washers to loosen somewhat so that the nose is free of the rotating body 10 and due to the fins 137 shown in Fig. 7, the nose portion will be stopped from rotating with the body 10. The electrical connecting means is shown the same as described in Fig. 20, to be described hereinafter.

Fig. 9 and Fig. 17 indicate generally a type of directing means showing a plurality of elevators 138, 178, 179 and 183, substituted for the rocket chambers 63, 64, 174 and 175 of Fig. 1 and Fig. 22, for directing the projectile to function in conjunction with the rocket propelling means in chamber 16 which may be adapted for use on the projectile shown in Fig. 1, or as previously described, a body and it is to be understood that the elevator means may be of any suitable type or means of operation, or the placement, as the invention contemplates elevator or vanes placed on any portion of the body.

Fig. 17 shows a section view with part in perspective of Fig. 9, showing the motor and gear means of operating the elevators and most parts of the nose are constructed as shown and described in Fig. 1, and the function of the nonfriction means are the same. The fins 137 shown in Fig. 9, perform two functions, as previously described. One of the elevators is shown at 138, open, Fig. 9 and Fig. 17. By using two motors it is possible to simultaneously operate any one of the elevators and either of the elevators on either side, as elevator 179 may operate with elevator 178 or 138 simultaneously.

The reversible motors are shown in Fig. 18, and are generally indicated by the reference characters F and G. The motor F controls the elevators 138 and 183, while the motor G controls the elevators 178 and 179. The rotor of motor F shown at 145 in Fig. 4, includes a permanent magnet with field poles 146. The motor F is included in an electric circuit and the main wires are numbered to correspond to those of Fig. 2 and Fig. 13, with a wire 85 contacting the top part of the rotor 145 and continuing from and attached to contact terminal 117. A wire 88 contacting the opposite side of the rotor 145 continuing from and attached to a wire 89, which wire 89 is attached to a second contact terminal 118. The wire 88 is attached to a wire 94 which wire 94 continues and is attached to one side of the firing device 19. A wire 92 contacts the opposite side of firing device 19 and continues to and is tapped to the center of the battery 36. Contact terminals 117 and 118 are adapted to close a circuit to the motor and the firing device 19 when electro-magnet 142 is energized by the radiation means 74. When the solenoid 142 is energized its core becomes magnetized and attracts the magnetized compass needle 153. The magnetized compass needle is swung to the right being pivoted at its center as shown in 154, Fig. 4 and Fig. 14. When the magnetized compass needle 153 is swung to the right, a connection is made between the contact terminals 117, 157 and 155, and a second contact is made between contact terminals 118 and 156. Contact terminal 155 is connected by a wire 90 which continues from and is attached to a helical spring 158 which spring acts as a conducting wire and connects to the wire 159 and 81. Wire 81 continues to and connects to the positive terminal of the battery 36. Contact terminal 156 is connected by a wire 161 which continues from and is attached to a second helical spring 162. Said spring acts as a conducting wire and connects to the wire 163, which wire continues from and is attached to the negative terminal of the battery 36. Included in the electrical circuit a third contact terminal 157 adapted to touch the contact terminal 155 on the movement of the magnetic needle 153 for positive battery supply. The contact terminal 157 is connected to a wire 160 which extends and connects to one side of the solenoid 108. A wire 164 is attached to opposite side of the solenoid 108 and continues and attaches to the wire 166. Wire 166 continues to and is attached to the wires 163 to the negative terminal of the battery 36.

When the photo-electric cell 74 is energized, a current flows through wires 77, 82, and 83, and is amplified in block diagram 105. The wires 82 and 83 carry this amplified current to solenoid 142 which attracts the magnetic compass needle 153 and connects the contact terminals.

Upon the completion of this circuit to the battery, the motor F, shown in Fig. 17, turns in a counter-clockwise direction thus turning the motor shaft 170 and gear 165 on it in a counterclockwise direction and simultaneously activates the solenoid 108, Fig. 4 and Fig. 17. The solenoid's soft iron core 112 is forced to move in the coil 108 thereby forcing rod 168 in a direction so that the teeth of the clutch gear segment 169 meshes with the teeth of the large gear 165. Clutch gear segment 169 is hinged at 171 to the rod 168 and the clutch gear segment 169 has a projected metal hook 172 to prevent the clutch gear segment from swinging counterclockwise, and the rod 168 is likewise hinged to the elevator 138 at 173. As the motor is turning clutch gear 165 in a counterclockwise direction, the rod 168 is forced upward forcing elevators 138 outward from the nose portion 13. Simultaneously with this action the firing device 19 becomes active, and activates the propelling rocket charge in chamber 16, if it has not already been activated by the front photo-electric cell 75.

When the elevator 138 reaches its maximum open position it is held in this position until the solenoid coil 108 becomes de-energized and spring 111 pulls the soft iron core back, thereby releasing pressure on the rod 168. The clutch gear segment 169 turns in a clockwise direction when pressure from soft iron core 112 is released and frees its teeth from the teeth of the large gear 165 and the spring 190 pushing against rod 168, releases clutch gear segments 169 from the gear 165 and the elevator and rod 168 returns to normal position. This elevator is hinged at 167 with a spring in the hinge, and with the help of spring 190, or the air pressure exerted against the elevator 138 when the projectile is moving and the elevator 138 and rod 168 returns to normal or neutral position. The spring 190 is fastened in the nose 13 and is slidably fastened to the rod 168 in any suitable manner.

When the photo-electric cell 76 is activated a current flows through wires 78, 82, and 84 to block diagram 181 where it is amplified, the amplified current flows through wires 82 and 84 which wires form an electro-magnet 182 containing a fixed soft iron core, which becomes a magnet and attracts the magnetized compass needle 157 to it, thereby connecting contact terminals 184 with contact terminal 186, and contact terminal 185 with contact terminals 187, 188.

As previously described of contact terminals 155 and 156, contact terminals 184 and 185 are likewise attached to the same wires, wires 90 and 161, which wires are attached to the helical spring 158 and 162, and wires 159 and 163 to the positive and negative terminals of the battery 36. When the magnetized compass needle bottom portion swings to the right, attracted by solenoid 182 when energized, a connection is made to the negative terminal of the battery 36 by contact terminals 184 and 186 touching and a connection is made to the positive terminal of the battery 36 by contact terminals 185 and 187 and 188 touching. Contact terminal 187 is attached to the wire 88 which leads from and is in contact with the reverse side of the rotor 145 to that of contact terminal 117. The wire 94 attaches to the wire 88 and leads to one side of the firing device 19. The opposite side of the firing device 19 is attached to the wire 92 to and is tapped to the center of the battery 36. A wire 85 is in contact with the reverse side of the rotor 145 and continues and is attached to a wire 191 which wire 191 continues and is attached to the contact terminal 186. A wire 189 and 192 is attached to the contact terminal 188 which wires 189 and 192 continue to one side of the solenoid 193. A wire 164 connects to the opposite side of the solenoid 193 which wire 164 connects to the common wire 166 and 163 to the negative terminal of the battery 36. On the completion of this circuit, the motor runs in a reverse direction to the direction of the completion of the top shown contact terminals 117 and 118. When this circuit is completed the motor F, Fig. 17, turns in a clockwise direction, thus turning the motor shaft 170 and large gear 165 attached to it in a clockwise direction and simultaneously energizes the solenoid 193. The movable soft iron core 194 forced to move in the coil 193, thereby forcing rod 195 in a direction so that the teeth of the clutch gear segment 196 meshes with the teeth of the large gear 165 and as clutch gear segment 196 is hinged at 197 to the rod 195 and the clutch gear segment 196 has a projected metal hook 198 to prevent the clutch gear segment from swinging clockwise, and the rod 195 is likewise hinged to the elevator 183 at 199. As the motor is turning clutch gear 165 in a clockwise direction, the rod is forced downward, forcing elevator 183 outward from the nose portion 13. Simultaneously with this action the electrically responsive device 19 becomes active and activates the propelling rocket charge in chamber 16, if it has not already been activated by the photo-electric cell 75. The elevator remains open until the photo-electric cell no longer is active. When inactive the elevator closes as previously described.

The second relay indicated generally by the reference character E, and is used to open the elevators 178 and 179 in like manner as described of relay D. It is to be understood however, that any of the radiation pick-up means may be used with the magnetic needle relay and that this relay may be used to activate the firing devices in the rocket chambers. This relay may be used without the amplifying circuits as it will close a circuit on a low amperage.

One of the relays shown in Fig. 4, or the relay D, is diagrammatically illustrated in Fig. 14, comprising a suitably shaped upwardly open container 220 adapted to hold a quantity of suitable liquid 221 for the purpose subsequently stated. Mounted across the open top of said container 220 is a platform 222, preferably constructed to also serve as a cover for said container. Buoyantly borne by the liquid 221 within the container is a float 225 which is free to revolve upon the liquid about its vertical axis with a minimum of frictional resistance to such movement. Said float may comprise a hollow body, as shown, made of any suitable material, or a solid body of low specific gravity, such as cork, wood, or the like.

Affixed to the upper side or top of said float 225 in upward axial extension therefrom, is an arbor 226, said arbor passes through an opening 227 with which the platform 222 is provided, so as to project exteriorly from the container 220 and above the top surface of the platform 222. Arranged with the opening 227 is a collar 228, preferably made of felt or similar material, through which the arbor loosely passes, so as to be freely rotated therein. Said collar 228 obstructs any accidental outward escape of the liquid content of the container 220, while at the same time operating to prevent lateral displacement of the arbor and the float to which the latter is connected.

Secured to the exterior upper end portion of said arbor 226 is a metallic bar 154, Fig. 4 and Fig. 14. Said bar 154 comprises at least one laterally extending magnetized compass needle 153, and as shown, when a double effect relay is desired, comprises oppositely extending magnetized compass needle 153. Said bar 154 is normally held in a predetermined initial or neutral position by balanced tension means of small force, which although sufficient to retain the bar in a desired neutral position will nevertheless offer but little and easily overcome impedance to operative movement of the bar. One illustrative form of such balanced tensional means comprises a pair of helical coiled springs 158 and 162, the same being respectively anchored by their inner ends to anchor post, shown in the form of screw connecting means, Fig. 4, respectively affixed to the platform 222 on opposite sides of the arbor 226. The outer ends of said hair-springs are secured, in any suitable manner to diametrically opposite sides of said arbor 226, or if desired, directly to the central part of the bar 154 itself. One of said springs is coiled clockwise and the other anti-clockwise, so that their tensional stresses are transmitted to the needle or bar are normally in balanced opposition, with the result that rotative swing of the bar 154 in one direction, a clockwise direction, increases the tension of one of said springs and relaxes that of the opposite spring, while rotative swing of the bar 154 in the opposite direction, anti-clockwise direction, increases the tension of said opposite spring and relaxes that of said first mentioned spring. When, however, the bar is released from the effect of a rotation inducing force, the stressed spring will return said bar to its predetermined normal initial or neutral position.

Mounted on the platform 222 is an electro-magnetic means for applying rotation induced force to the bar 154, the same being disposed in lateral opposition to a free end portion of the needle or needles 153 of the bar 154. In the double effect form of relay shown, an electro-magnet 142 is so opposed to the needle 153 of the bar and a similar electro-magnet 182 is so opposed to the opposite side of said needle 153, of said bar. Each electro-magnet is connected in the circuit with a desired comparatively weak electric energy Fig. 4, to which the relay is desired to be responsive. When the electro-magnetic means is energized the bar 154 will swing upon the substantially frictionless pivoted support provided by the float 225, thus moving the needles 153 to carry its contact member 155 and 156, 184 and 185.

It will be obvious that the arbor 226 of the needles 153 is capable of axial movement relative to the container top, whereby the construction is adapted for use in a shell or projectile since under inertia or force of set-back, occurring when the shell or projectile leaves the gun, the needle structure may be stopped against the container top, and the float 225 would be protected from shock by resting on the bottom of its container until the force of acceleration diminishes, at which time the float 225 would be buoyed up by the liquid 221 in the container 220, and the needle structure would be returned to normal operative position. In this connection the springs 158, 162, could, if desired be placed above the needles 153, so that the underside of the latter may directly abut the top surface of the container under the inertia reaction referred to.

Referring now to Fig. 15, of the drawings, there is shown thereby, a somewhat modified form of the relay device according to this invention, wherein a different type of substantially frictionless pivotal support for the bar 154 is provided. In this modified arrangement, a supporting platform 231 is provided and supported above and in spaced opposition thereto is a cross-head 232. Suitably mounted on said platform 231 is a lower jeweled bearing 233, and suitably mounted on the cross-head is an upper jeweled bearing 234 arranged in opposed and aligned relation to said lower jeweled bearing. The arbor 226 of the bar 154 is provided at its opposite end with needle point bearing terminals 235 which respectively engage the respective jeweled bearing 233 and 234 whereby to provide a substantially frictionless pivotal support for said bar 154. In this modified arrangement, a somewhat different form of balanced tensional means is provided for yieldably holding the bar 154 in normal initial or neutral position. This modified balanced tensional means comprises an upper spirally coiled hair-spring 236, having one end fixed to the upper part of the arbor 226 to wind around the same, and with its opposite end anchored to an anchor post 237, suitably affixed to the cross-head 232, and a lower spirally coiled hair-spring 238, having one end fixed to the lower part of the arbor 226, to wind around the same, and with its opposite end anchored to an anchor post 239 suitably affixed to platform 231.

As shown in the accompanying drawings, bar 154 is so related to associated controlled circuit contact devices, as to open a controlled circuit when the bar is disposed in normal initial position, and to close said controlled circuit when the bar is moved by the electro-magnetic means, it will nevertheless be understood by those skilled in the relay art, that the reverse of such arrangements could be provided for and utilized so that a controlled circuit would be closed when the bar is disposed in a normal initial position and would be opened when the latter is moved by the electro-magnetic means. This type relay is to be used in a body where the force of set-back does not occur.

The pull of the magnetism of the needles 157 alone, when the electro-magnets 142 and 182 are de-energized, is insufficient to overcome the balancing action of the springs 158, 162, 236 and 238. When the electro-magnets 142 or 182 are energized their pull combined with the pull of the magnetic needle becomes sufficient to move the bar 154 against the spring tension. Such conditions increase the sensitivity of the relay in response to the pull of the magnets 142 and 182 when the latter are but weakly magnetized by weak electrical currents. It is to be understood that the needles 157 may not be a magnet and function as previously described.

Fig. 16 illustrates an additional radiation responsive means of control for the elevators and the rocket propelling means and the same wires are shown as previously described in Figs. 2, 4, 5 and 13.

The magnetic needle relay means has been described on how it operates the motor or rocket charges, but the solenoids may be adapted to operate the motor likewise, as shown in the solenoids 108 and 193, of Fig. 16 and Fig. 17. The solenoid 108 is shown connected to the output of the circuit in Fig. 16, by wires 82 and 83. As the solenoid 108 is energized the soft iron core 112 moves in the coil 108 and connects the terminals.

Terminals 114 and 118 connect the positive side of the battery 36, while contact terminals 113 and 117 connect the negative terminal of the battery 36. On the completion of this circuit the battery is connected to the firing device 19 and the rotor 145 of the motor F. The wiring in this view may be checked with the wiring of Fig. 2. As shown, the contact terminal 114 is connected to the wire 81, which wire leads to the positive terminal of the battery 36. The contact terminal 118 is connected to the wire 90, which wire 90 continues to and connects to wire 85, which wire 85 is attached to one side of the rotor 145 of the motor F. The wires 88 and 89 attach to the opposite side of the rotor 145, which wire 88, continues to and attaches to the contact terminal 117. Contact terminal 117 when in connection with contact terminal 113 completes a circuit to the negative terminal of the battery 36 by wire 92. Simultaneously with this action, the wire 94 attached to the wire 90 carries the positive charge to one side of the firing device 19. The wire 100 is attached to the opposite side of the firing device 19, which wire 100 is attached to wires 88, 89, and through the contact terminal connection of contact terminal 113 and 117, and on wire 92 to the negative terminal of the battery 36. If we check solenoid 108, as shown in Fig. 17, we will see that the solenoid performs two functions when moved in the coil 108. (1) It connects the wire to the rotor 145 of the motor F and runs the motor in a counter-clockwise direction, thus turning large gear 165 in a counter-clockwise direction, and simultaneously activates the firing device 19, Fig. 16. (2) When the soft iron core 112 moves in the coil 108, the soft iron core pushes against rod 168 and connects the teeth of the clutch gear segment 169 to the teeth of the large gear 165, Fig. 17, and the elevator 138 opens.

Solenoid 193 is coupled to an amplifying circuit, and the output is connected to the wires 82 and 84, which wires are connected to the pick-up means 76, Fig. 2. As previously described of solenoid 108, when the solenoid 193 is energized, the soft iron core 194 connects contact terminal 99 and 206 to connect the positive side of the battery 36, while contact terminals 1.; and 205 connect the negative terminal of the battery 36. The contact terminal 206 is connected to the wire 81 to the positive terminal of the battery 36. The contact terminal 99 is connected to a wire 104 which wire 104 connects positive voltage to the opposite side of the rotor 145 of the motor F, to that of which the solenoid 108 connects. The wire 85 connects the opposite side of the rotor 145, which wire 85 continues to and connects to the wire 90. These two wires 85 and 90 are attached to the contact terminals 101 and through the contact terminal connection of contact terminals 101 and 205, and on the wire 92 to the negative terminal of the battery 36. Simultaneously with this action the wire 100 is attached to the wire 104 and carries the positive charge to one side of the firing device 19. The opposite side of the firing device 19 is connected to the wire 94, which wire 94 continues to the wire 90, which wire 90 continues through the contact terminal connection of contact terminals 101 and 205 and to the negative terminal of the battery on wire 92. As the core 194 is moved to complete this circuit, the core 194 exerts a pressure on rod 195, Fig. 17, and connects the teeth of the clutch gear segment 196 to the teeth of the large gear 165, and as the motor is now turning in a clockwise direction the elevator 183 opens.

Fig. 19 shows some of the means responsive to radiation and which radiation means may be tuned to various frequencies on the spectrum, depending on the requirements.

In Fig. 19 there is shown microphones 296 and 297 attached to the same wires 77, 83 and 78, 84, as shown in the other views, the block diagram 105 and 181 are the same as shown in the other views, the wiring 82, 83 and 82, 84, leading from the block diagrams are the same as shown in the other views.

Fig. 11 shows another means of completing a circuit on a low amperage and adapted to withstand the force of set-back occurring in the gun, as the magnetic compass needle of Fig. 4 and Fig. 14. This relay consists of a container 301 adapted to hold a portion of some desired form of conducting material in the form of small granules 302. Included with the body 301 is an electro-magnetic means 303 including a coil 304. The wires 82 and 83 as may be checked in Fig. 2, are connected to the photo-electric cell 74, and to the coil 304 of the electro-magnetic means 303. The coil 304 contains a soft iron core 305 in the shape of a horseshoe, but containing no magnetism until the electro-magnetic coil 304 is energized. Attached to each end on the horseshoe shaped soft iron core 305 are two contact terminals 306 and 307, properly insulated from the soft iron core. These two contact terminals 306 and 307 are attached to the wires 90 and 85, as shown in Fig. 2 and the other drawings, which wires connect the firing devices or the elevator means as shown in the other drawings. As the horseshoe shaped soft iron core 305 becomes magnetized by the current flowing through the coil 304, it attracts the small granules of metal 302 to the contact terminals 306 and 307, and a circuit is completed through the two contact terminals and the small pieces of metal, thereby forming a circuit between the two contact terminals 306 and 307. This connects the battery 36 to the several parts as previously described, to connect the firing devices or open the elevators. It is to be understood that more than one of the electro-magnetic means 303 may be placed in the container 301 and connect wires leading the other pick-up means and actuate the other firing devices or elevators as described in the solenoid 108 and 193 of Fig. 5, or Fig. 13.

An electrical connecting means between the rotating and non-rotating portions is shown in Fig. 3 and Fig. 20. Fig. 3 shows how the nose 13 is attached to the rotating portion of the projectile body 10. The rear or rotating body portion 10 has a projecting part 333 which protrudes into a recessed portion in the rear of the nose portion 13, in back of the recessed portion the nose has a projecting part 334, which fits a recessed portion in the front part of the body. It is apparent by this arrangement the two portions would be held together and at the same time the friction between the two portions would be reduced to minimum. This allows the rear portion to rotate without disturbing the nose portion. Bearings 14 are placed between the two portions, Fig. 3 and Fig. 7. 332 shows the hardened metal threaded in the nose. 335 shows hardened metal threaded in the body portion to make possible the placement of the bearings. The wires 91, 89, and 94 are shown attached to a contact terminal means, contacting each side of the bearings 14. The bearing 14 acts as a connection between the two wires.

Fig. 20 shows another method of electrical connecting means between the rotating body portion and the non-rotating nose portion. The wire 89, as shown in Fig. 2, is shown attached to contact terminal 322. Wire 90 is shown attached to contact terminal 323. These contact terminals 322 and 323 are positioned in the non-rotating nose portion 13, and extend into the space 15 between the two portions. Positioned in the rotatable body portion, are companion contact terminals 324 and 325, also extending into the space 15 between the two portions. Contact terminal 324 is shaped in a circular band, and contact terminal 325 is shaped in a second circular band, these two bands are so positioned that they do not touch each other. Contact terminals 322 and 323 rotate on these bands. In back of the contact terminal bands is a spring 326 properly insulated from the bands, and which spring 326 maintains the contact terminal in a connecting position. Connected to contact terminals 324 and 325 are wires 81 and 94, also shown in Fig. 2, these two wires are adjusted in any suitable manner so that they will stretch one-half turn when member 26 is acted on by inertia. These wires lead to the two contact terminals 327 and 328 located on the tubular arming member 26, positioned in the container 30 in plunger 25. Two contact terminals 329 and 331 adapted to come in contact with contact terminals 327 and 328 when the plunger 25 rotates with the projectile body 10 to complete a circuit connecting wires 81 and 94, to connect the various parts of the firing devices or elevators, to the battery 36.

It is evident that the non-rotating portion may be moved in or on any part of the projectile body.

While the drawings show the pick-up means on one side and side rockets generally opposite thereto, or elevators located on the same side as the pick-up means and showing these means to be located on the nose of the projectile, it will be understood that as shown in my co-pending application Serial No. 340,629, filed June 15, 1940, of which this application is a continuation-inpart, the side rockets or elevators may be located at the rear of the projectile. The pick-up means may be located at other suitable parts in or on the projectile. In all instances the relative position of the rocket or elevator directing means will be so positioned in or on the projectile as to exert a pressure on the front axis, or the rear axis, to turn the longitudinal axis of the projectile in the general direction of the approaching radiation which is activating the pick-up means located in the direction of the approaching radiation, regardless of the relative position of the pick-up means to the rocket or elevator directing means on the projectile. The pick-up means are so arranged to operate the deflecting means only while subject to radiation.

It is within the scope of the invention to explode the projectile when it reaches the vicinity of the object to be destroyed, either by a timing device as shown in my co-pending application Serial No. 340,629, filed June 15, 1940, of which this application is a continuation-in-part, or by radiation. At 209 Fig. 2 is shown a radiation responsive receiving means. For the sake of illustration, a photo-electric cell 209 is shown. The photo-electric cell 209 Fig. 2 is included in an electrical circuit with the wire 211 attached to the cathode, which wire 211 continues through the amplifying circuit 212 to and attaches to the common wire 33, which wire 33 attaches to one side of the firing device 34. The anode is attached to a wire 210, which wire 210 continues through an amplifying circuit 212 to and is attached to a contact terminal 213 located in plunger 25 and so positioned that on the arming of the fuse contact terminals 213 and 214 are adapted to engage. Contact terminal 214 is attached to a wire 215, which wire continues to and is attached to the wire 29 located in arming member 26, which wire 29 connects to wire 37 to the positive terminal of the battery 36. The opposite side of the firing device 34 is attached to the wire 35, which wire 35 continues to and is attached to the negative terminal of the battery 36. The amplifying circuit 212 contains the conventional amplifying circuit or the one shown in Fig. 16, as has been previously described. The wires are connected from the amplifying circuit by the solenoid means or electromagnetic means as has been described of Fig. 4, Fig. 5, Fig. 13, or Fig. 16. It is within the scope of the invention to send radiation to the radiation responsive receiving means 209 from positions remote from the body, or this radiation may be reflected from the target, or stopped by the target, as has been previously described of the other radiation responsive receiving means to activate the firing device 34 to explode the main destructive charge 9.

While only one embodiment of the present invention has been shown and described, many modifications will be apparent to those skilled in the art within the spirit and scope of the invention as set forth in the appended claims.

I claim:

1. A projectile adapted to be impelled along a trajectory, comprising a body having a rocket charge arranged to exert a force substantially on the axis of the body, means on said body for turning the body at an angle to the trajectory, means on the exterior of said body responsive to radiation for discharging said charge, and actuating said turning means.

2. The combination claimed in claim 1, said body being elongated, said rocket charge being in the rear of said body and substantially on the axis of the body.

3. In an elongated projectile adapted to be initially impelled along a trajectory, radiant energy responsive means on said projectile responsive to rays of energy travelling at an angle to the longitudinal axis of said projectile, means controlled by said radiant energy means for bodily turning said projectile towards the immediate source of said rays, a normally inactive rearwardly directed rocket charge in said projectile, and radiant energy responsive means on said projectile responsive to rays of energy travelling axially of said projectile for activating said rocket charge.

4. A projectile adapted to be impelled along a trajectory comprising an elongated body having a rocket charge confined in the rear thereof, means on said body responsive to a ray of radiant energy impulses at an angle to the longitudinal axis of said body for turning said body in the direction of said ray, and means on said body responsive to radiant energy impulses travelling axially of said body for actuating said rocket charge.

5. A projectile adapted to be impelled along a trajectory, comprising a nose portion and a body portion mounted for relative rotation, a plurality of pick-up means responsive to radiation arranged on the exterior of one of said portions, deflecting means on one of said portions respectively responsive to said pick up means for turning the longitudinal axis of said projectile generally towards the source of radiation, rocket means in one of said portions for impelling said projectile in the direction of its longitudinal axis, and radiation responsive means for actuating said rocket means.

6. The combination claimed in claim 5, said deflecting means comprising a plurality of normally retracted circumferentially spaced elevators, and means for extending at least one of said elevators.

7. The combination claimed in claim 5, said deflecting means comprising a plurality of circumferentially spaced, substantially radially directed rocket charges, each of said rocket charges being coupled with a pick-up means on the opposite side of said nose portion.

8. The combination claimed in claim 5, the means for actuating said rocket means comprising radiant energy pick-up means responsive to radiant energy from the direction in which said shell is pointed.

9. The combination claimed in claim 5, said radiation pick-up means comprising photo-electric cells, said deflecting means comprising a plurality of radially operating deflecting devices annularly spaced around one portion, individual electrical means for operating said deflecting devices, and relay means respectively between said cells and the electric means for operating the deflecting device said relay means adapted to withstand the force of set-back and to close a circuit on a low amperage.

10. The combination claimed in claim 5, and means for preventing rotation of said nose portion.

11. The combination claimed in claim 5, said pick-up means comprising outwardly facing photoelectric cells, relay means coupled to said cells, and motor means actuated by said relay means for operating said deflecting means, the means for actuating said rocket charge comprising a forwardly facing photo-electric cell in the nose portion, and relay means connected thereto for activating said rocket charge.

12. The combination claimed in claim 5, said pick-up means comprising outwardly directed acoustical receptors.

13. The combination claimed in claim 5, said pick-up means comprising outwardly directed acoustical receptors, the means for actuating said rocket charge comprising a forwardly directed acoustical receptor in the front of said nose portion, and relay means responsive to predetermined activation of the last-mentioned receptor connected to said rocket charge.

14. The combination as claimed in claim 5, and means for shielding said pick-up means against rays directed other than generally radially thereto and from forwardly thereof.

15. A projectile adapted to be impelled along a trajectory, comprising a nose portion and a body portion rotatably connected, pick-up means responsive to radiation in one side of one portion, first rocket charge means directed outwardly from the side of said one portion generally at right angles to said pick-up means, rearwardly directed rocket charge means in the body portion, means for actuating the first rocket charge means by said pick-up means, and means for actuating the second rocket charge means.

16. A projectile adapted to be impelled along an initial trajectory, comprising an elongated body having a plurality of pick-up means responsive to radiation carried by said body, a plurality of deflecting means carried by said body respectively responsive to said pick-up means for re-directing the projectile at an angle to said initial trajectory, rocket means in the body for impelling said body in the direction in which it is pointed, and means controlled by the radiation responsive means for actuating said rocket means and said deflecting means simultaneously.

17. A projectile adapted to be impelled along a trajectory, comprising a nose portion and a body portion rotatably mounted on the nose portion, a plurality of outwardly faced pick-up means responsive to radiant energy and arranged on said nose portion, deflecting means arranged on said nose portion for co-operating with said pick-up means for pointing said projectile towards the direction of the outwardly faced position of the actuated pick-up means, rocket means in the body portion for impelling said projectile in the direction in which it is pointed, and means for actuating said rocket means and said deflecting means by said actuated pick-up means for controlling the movements of said projectile.

18. A projectile adapted to be propelled along a trajectory, comprising a body having a rocket charge arranged to exert a force substantially along the axis of the body, means on said body for turning the body at an angle to the trajectory, means on said body responsive to radiation for actuating said turning means and discharging said charge, said means including means responsive to a signal external of the projectile for operating the discharging means, whereby the charge may be effective substantially at the time of operation of the turning means.

MARION B. ROBINSON.

REFERENCES CITED

The following references are of record in the file of this patent:

UNITED STATES PATENTS

| Number | Name | Date |
| --- | --- | --- |
| 1,181,203 | Alard | May 2, 1916 |
| 1,307,607 | Wilkins | June 24, 1919 |
| 2,255,245 | Ferrel | Sept. 9, 1941 |

FOREIGN PATENTS

| Number | Country | Date |
| --- | --- | --- |
| 522,506 | France | Apr. 1, 1921 |
| 441,866 | Great Britain | Jan. 27, 1936 |
| 797,933 | France | Feb. 24, 1936 |
| 472,322 | Great Britain | Sept. 21, 1937 |
| 831,496 | France | June 7, 1938 |
| 832,427 | France | July 4, 1938 |
| 836,555 | France | Oct. 17, 1938 |